(12) United States Patent
Frühauf et al.

(10) Patent No.: US 12,480,963 B2
(45) Date of Patent: Nov. 25, 2025

(54) METHOD FOR OPTIMIZING A MEASUREMENT RATE OF A FIELD DEVICE

(71) Applicant: Endress+Hauser SE+Co. KG, Maulburg (DE)

(72) Inventors: Dietmar Frühauf, Lörrach (DE); Marco Braun, Ismaning (DE); Alexander Franke, Birsfelden (CH)

(73) Assignee: Endress+Hauser SE+Co. KG, Maulburg (DE)

( * ) Notice: Subject to any disclaimer, the term of this patent is extended or adjusted under 35 U.S.C. 154(b) by 793 days.

(21) Appl. No.: 17/783,957

(22) PCT Filed: Nov. 20, 2020

(86) PCT No.: PCT/EP2020/082901
§ 371 (c)(1),
(2) Date: Jun. 9, 2022

(87) PCT Pub. No.: WO2021/115760
PCT Pub. Date: Jun. 17, 2021

(65) Prior Publication Data
US 2023/0010373 A1   Jan. 12, 2023

(30) Foreign Application Priority Data

Dec. 9, 2019  (DE) .......................... 102019133600.7

(51) Int. Cl.
*G01N 35/00* (2006.01)
*B01L 3/00* (2006.01)
*G16C 20/70* (2019.01)

(52) U.S. Cl.
CPC .. *G01N 35/00712* (2013.01); *B01L 3/502715* (2013.01); *G16C 20/70* (2019.02);
(Continued)

(58) Field of Classification Search
CPC ......... G01N 35/00712; B01L 3/502715; B01L 2200/16; B01L 2300/0636; B01L 2400/082; G16C 20/70; G01D 21/00
See application file for complete search history.

(56) References Cited

U.S. PATENT DOCUMENTS

2014/0088873 A1* 3/2014 Miller .................... G01D 11/00
702/4
2018/0019910 A1  1/2018 Tsagkaris et al.
(Continued)

FOREIGN PATENT DOCUMENTS

CN    102857938 A    1/2013
CN    104394580 A    3/2015
(Continued)

OTHER PUBLICATIONS

Tayeh, Gaby Bou et al. A Spatial-Temporal Correlation Approach for Data Reduction in Cluster-Based Sensor Networks. IEEE Access, Open Access Journal, Apr. 12, 2019, vol. 7, 2019. Lebanese University Research Program, Fanar, Lebanon.

*Primary Examiner* — Brian J. Sines
(74) *Attorney, Agent, or Firm* — Kelly J. Smith; Endress+Hauser (USA) Holding, Inc.

(57) ABSTRACT

The present disclosure relates to a method for optimizing a measurement rate of a field device in a measurement system. The measurement system includes at least one second field device in which a measurement variable of the field device is correlated with the measurement variable of the second field device. The method determines a respective specific correlation pattern between the first measurement variable and the second measurement variable based on a learning phase. This makes it possible to check the measured values from the second field device for the correlation pattern during normal measurement operation and to change the measurement rate of the field device during the correspond- (Continued)

ing time window. This makes it possible to increase the service life and/or availability in the process installation.

7 Claims, 2 Drawing Sheets

(52) U.S. Cl.
CPC ... *B01L 2200/16* (2013.01); *B01L 2300/0636* (2013.01); *B01L 2400/082* (2013.01)

(56) References Cited

U.S. PATENT DOCUMENTS

| | | |
|---|---|---|
| 2019/0244102 A1 | 8/2019 | Harvey |
| 2019/0278236 A1 | 9/2019 | Koshy et al. |

FOREIGN PATENT DOCUMENTS

| | | | |
|---|---|---|---|
| CN | 108549840 | A | 9/2018 |
| DE | 102008016940 | A | 4/2008 |
| DE | 102008036968 | A | 8/2008 |
| DE | 102008016940 | A1 | 10/2009 |
| DE | 102008036968 | A1 | 2/2010 |
| DE | 102010027144 | A | 7/2010 |
| DE | 102010027144 | A1 | 1/2012 |
| DE | 102017200134 | A | 1/2017 |
| DE | 102017200134 | A1 | 7/2018 |
| GB | 1556301 | A | 11/1979 |
| GB | 2186468 | A | 8/1987 |
| WO | 2015135559 | | 9/2015 |
| WO | 2015135559 | A1 | 9/2015 |

\* cited by examiner

METHOD FOR OPTIMIZING A MEASUREMENT RATE OF A FIELD DEVICE

CROSS-REFERENCE TO RELATED APPLICATIONS

The present application is related to and claims the priority benefit of German Patent Application No. 102019133600.7, filed on Dec. 9, 2019, and International Patent Application No. PCT/EP2020/082901, filed Nov. 20, 2020, the entire contents of which are incorporated herein by reference.

TECHNICAL FIELD

The invention relates to a method for optimizing a measurement rate of a field device in a measurement system.

BACKGROUND

In automation technology, especially for process automation, field devices that serve to detect various measurement variables are often used. The measured variable to be determined can, for example, be a fill level, a flow, a pressure, the temperature, the pH value, the redox potential, a conductivity or the dielectric value of a medium in a process plant. In order to detect the corresponding measured values, the field devices each comprise suitable sensors or are based on suitable measuring principles. A variety of such types of field devices is produced and marketed by the Endress+Hauser group of companies.

In the respective process installation, the individual field devices are generally connected together to form a measurement system in order to be able to coordinate the corresponding process variables with suitable actuators, such as heating elements, stirrers, valves or pumps for inlets and outlets. Accordingly, the measurement variables of the individual field devices of a process installation also possibly correlate with one another. For communication within the measurement system, the field devices may be connected to one another either directly or also centrally via a control unit, such as a process control station. Primarily in the case of field devices arranged at locations of the process installation that are difficult to access, wireless transmission protocols, such as Wireless HART or WLAN, are preferably implemented for communication within the measurement system. In these cases, the energy supply of these field devices correspondingly takes place via batteries. The potential usage duration of the individual field device depends on the capacity of the battery and the measurement rate, i.e., the clocking and the measurement time per clock cycle, during which the field device measures the measured value.

In this context, however, the measurement rate must not be set too low, so that the process can be monitored sufficiently. In conjunction with the finite capacity of the battery, the corresponding field devices must therefore be taken out of operation in regular maintenance cycles in order to replace the battery. As a result, the processes within the process installation must also be stopped during these maintenance periods, since the processes may generally not run in a controlled manner without corresponding monitoring. This is disadvantageous for the plant operator, since any downtime of the process installation impairs its efficiency.

SUMMARY

The object of the invention is therefore to provide a method by means of which availability of battery-operated field devices can be increased.

The invention achieves this object by means of a method for optimizing a measurement rate of a first field device in a measurement system. In order to use the method, it is necessary here for the measurement system to comprise, in addition to the first field device, at least one second field device, wherein the at least two field devices each measure measured values of corresponding measurement variables at a particular measurement rate, and wherein at least the measurement variable of the first field device correlates with the measurement variable of the second field device. The method comprises the following method steps:

measuring the measurement variables of the at least two field devices in each case at a preset measurement rate during a defined learning phase, determining a correlation pattern between the first measurement variable and the second measurement variable on the basis of the measured values measured in the learning phase.

In doing so, at least the measured values of the second field device are checked for the correlation pattern during a measurement operation, wherein the measurement rate of the first field device is changed during measurement operation at least during the time window in which the correlation pattern is recognized in the measured values of the second measurement variable.

The optimal correlation pattern, such as a Pearson or partial correlation, can be determined by means of an automated machine learning algorithm.

The invention is thus based on checking the correlation of the individual measurement variables with respect to one another. If a strong correlation between the measurement variables is recognized by the method, this is evaluated as evidence for the functionality of the measurement system. Otherwise, a malfunction of the measurement system is assumed, so that the measured values are to be classified as incorrect or at least untrustworthy.

The measurement rate of the first field device can be reduced during measurement operation at least during the time window in which the correlation pattern is recognized in the measured values of the second measurement variable. As a result, the power consumption of the respective device can be reduced. This is advantageous primarily when the first field device and/or the second field device comprise a battery for energy supply, since this increases the battery life and thus the availability in the process installation.

In order to reduce any computing effort and thus accelerate the creation of the correlation pattern, redundant measured values from the learning phase may advantageously be filtered out for determining the correlation pattern, for example by means of an unsupervised clustering method.

A corresponding measurement system suitable for carrying out the method according to one of the preceding design variants has to comprise at least the following components:

a first field device designed to measure the first measurement variable at an adjustable measurement rate, a second field device designed to measure the second measurement variable, a control unit designed to determine a correlation pattern between the first measurement variable and the second measurement variable on the basis of the measured values measured in the learning phase, check at least the measured values of the second field device for the correlation pattern during the measurement operation, change at least the measurement rate of the first field device during the measurement operation at least during a time window in which the correlation pattern is recognized in the measured values of the second measurement variable.

In this case, the first field device and/or the second field device may be connected to the control unit by means of a wireless interface, for example.

Within the context of the invention, the term "unit" in principle refers to any electronic circuit that is designed to be suitable for the planned intended purpose. Depending on the requirement, it can therefore be an analog circuit for generating or processing corresponding analog signals. However, it can also be a digital circuit, such as an FPGA or a storage medium, in interaction with a program. In this case, the program is designed to perform the corresponding method steps or to apply the necessary calculation operations of the respective unit. In this context, various electronic units of the fill-level measuring device in the sense of the invention may potentially also access a common physical memory or be operated by means of the same physical digital circuit.

BRIEF DESCRIPTION OF THE DRAWINGS

The invention is explained in more detail with reference to the following figures. The following is shown.

DETAILED DESCRIPTION

Figure 1:
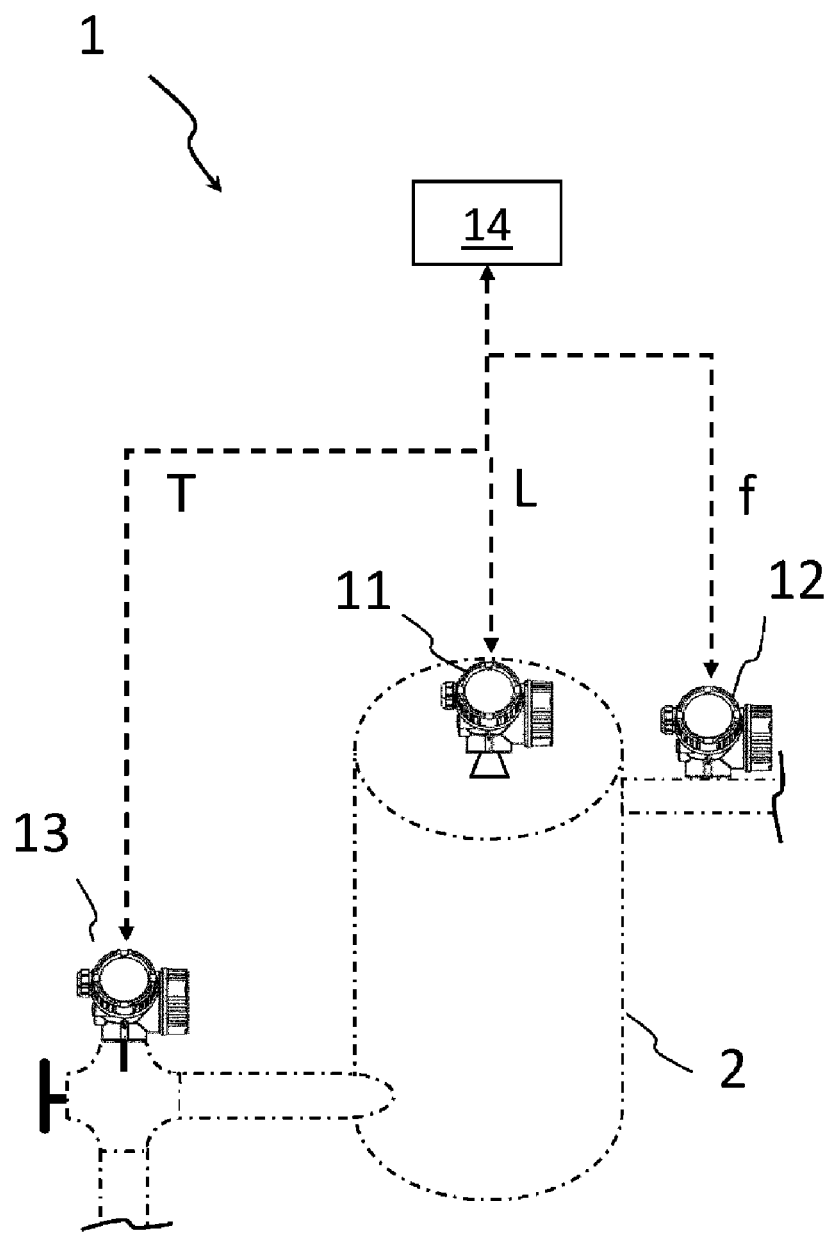
FIG. 1 shows a measurement system with three field devices in a process installation.

For the general understanding of the method according to the invention, FIG. 1 shows an exemplary measurement system 1 that serves for monitoring a process installation 2, such as a chemical reactor. For this purpose, the exemplary measurement system 1 comprises a flowmeter 12 at an inlet of the reactor 2, a fill-level measuring device 11 on the reactor 2 itself, and a temperature measuring device 13 at an outlet of the reactor 2 as field devices. The field devices 11, 12, 13 measure the corresponding measured values L, f, T in each case at an individually adjustable measurement rate, e.g., between 1 measurement per minute and 1000 measurements per second.

For example, reactants may be supplied via the inlet of the reactor 2, wherein the flow rate f at which the reactant is supplied is detected by means of the flowmeter 12.

The fill-level measuring device 11 measures the fill level L in the reactor 2 and thus monitors, for example, whether a critical fill-level value L is exceeded or undershot by the reaction or by supplying the reactant. Accordingly, the measured values of the fill-level measuring device 11 in the exemplary process installation 2 correlate with the measured values of the flowmeter 12 in that the fill level L in the reactor 2 increases linearly over time during the time interval Δt, in which a constant flow rate f prevails in the inlet. Thus, this exemplary correlation of the fill level L with respect to the flow rate f can be described functionally, since the fill level is formed by the antiderivative of the flow rate:

$$L(t) = \text{const.} + \int^{\Delta t} f(t) dt$$

Figure 2:
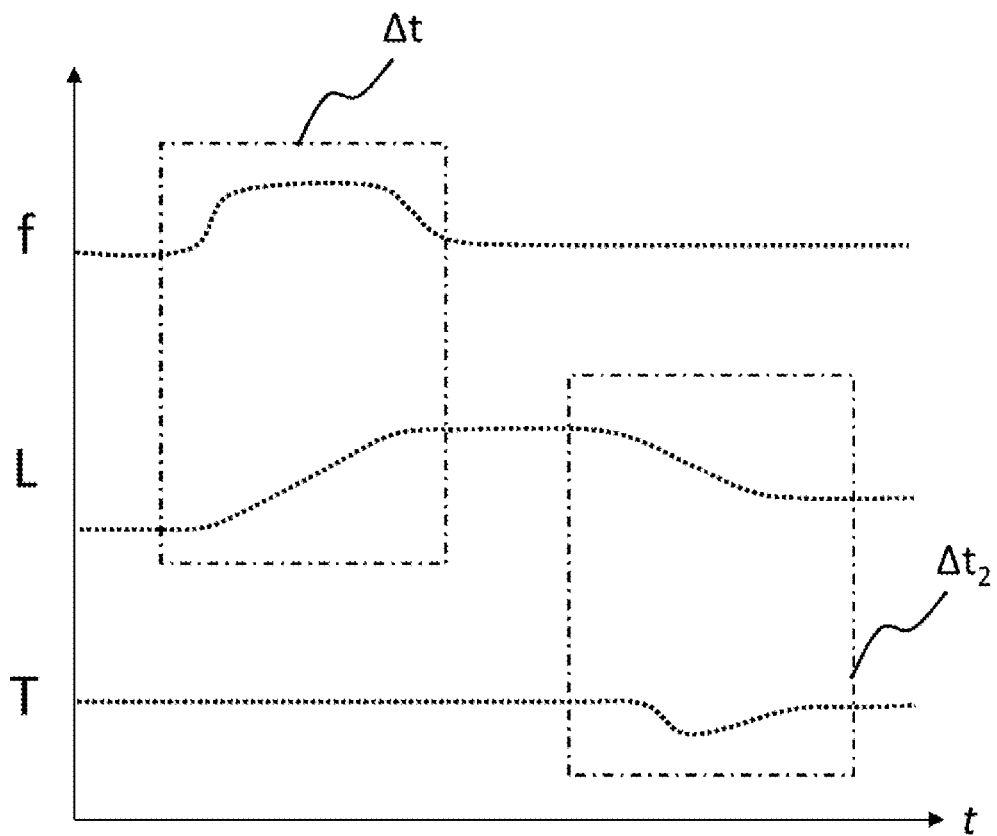
FIG. 2 shows a correlation between the measurement variables of the field

This correlation of the measured fill-level values with those of the flowmeter 12 is illustrated schematically in the graph of FIG. 2.

In the exemplary embodiment shown in FIG. 1, the temperature measuring device 13 at the outlet of the reactor 2 can in turn serve to measure the temperature T of a reaction product during the emptying of the reactor 2 in order to adapt the subsequent process steps accordingly, for example. If any chemical reactions in the process installation 2 proceed endothermically and therefore result in cooling in the reactor 2, the temperature measuring device 13 registers, depending on the ambient temperature, at least a short drop in the temperature T during the corresponding time interval $\Delta t_2$, in which the reactor 2 is emptied. Accordingly, the measured values of the temperature measuring device 13 also correlate with the measured values of the fill-level measuring device 11 in the case of a (linear) decrease in the fill level L (over time). This exemplary context is also shown schematically in the graph of FIG. 2.

In the design variant shown in FIG. 1, the measurement system 1 comprises a control unit 14 to which the field devices 11, 12, 13 are connected. The control unit 14 can, for example, be the process control system of the process installation. "PROFIBUS", "HART", "Wireless HART", or "Ethernet" can, for example, be implemented as an interface via that the field devices 11, 12, 13 are connected to the control unit 14. Especially in the case of a wireless design of the interfaces, the field devices 11, 12, 13 may be operated accordingly by means of a battery, so that no additional cabling is required for this purpose.

The measured values f, L, T measured by the field devices 11, 12, 13 may be transmitted via the interfaces. With a corresponding design, this makes it possible for the control unit 4 to determine the previously described correlation patterns between the measured fill-level values and the measured values f of the flowmeter 12 or the measured temperature values and the measured fill-level values during a defined learning phase. In order to find a suitable correlation type, such as a Pearson or partial correlation, the control unit 14 can apply an automated machine learning algorithm, for example.

After detection of the correlation patterns, the measurement system 1 according to the invention or the control unit 14 can transition into normal measurement operation. This means that during the measurement operation, the control unit 14 checks at least the measured values f of the flowmeter 12 for the previously determined correlation pattern. Specifically, there is a check of whether a (constant) flow rate f currently prevails. If this is recognized, it is derived therefrom that the fill level L must also change accordingly due to the previously recognized correlation pattern.

Since the fill-level change is foreseeable due to this type of correlation, the measurement rate of the fill-level measuring device 11 can, as a result, be reduced during measurement operation at least during the time window Δt, in which the correlation pattern is recognized in the measured flow-rate values f, without an unpredictable abrupt fill-level change with respect to the fill level L being expected. In the case that the fill-level measuring device 11 is battery-operated, its service life and thus its availability can thereby be optimized.

Analogously to the measured flow-rate values f of the flowmeter 12, the control unit 14 can also check, during the measurement operation, the measured values L of the fill-level measuring device 11 for the previously defined correlation pattern of the temperature measuring device 13 with respect to the measured fill-level values L. As soon as a fill-level decrease is detected, this is in turn recognized as the presence of the correlation pattern and a corresponding (brief) reduction of the temperature T at the temperature measuring device 13 is anticipated. Consequently, the measurement rate of the temperature measuring device 13 can also be reduced during measurement operation at least during the time window $\Delta t_2$, in which the correlation pattern is recognized in the fill-level values L, without an unforeseen temperature change being expected. In this way, the service life or availability of the temperature measuring device 13 in the case of battery operation may thus also be increased.

In the illustration shown, the control unit 14 is shown as a separate superordinate unit. Within the scope of the invention, however, it is also conceivable to design the control unit 4 not as an external device, but as a component of one of the field devices 11, 12, 13.

The invention claimed is:

1. A method for optimizing a measurement rate of a first field device in a measurement system, comprising the following method steps:
    measuring a first measurement variable at an adjustable measurement rate using a first field device,
    measuring a second measurement variable using a second field device, wherein the second measurement variable does not correspond to the first measurement variable,
    determining a correlation pattern between the first measurement variable and the second measurement variable on the basis of the measured values measured in a learning phase,
    wherein at least the measured values of the second field device are checked for the correlation pattern during a measurement operation, and wherein the measurement rate of the first field device is changed during measurement operation at least during a time window, in which the correlation pattern is recognized in the measured values of the second measurement variable.

2. The method of claim 1, wherein the correlation pattern is determined using an automated machine learning algorithm.

3. The method of claim 1, wherein the measurement rate of the first field device during the measurement operation is reduced at least during the time window, in which the correlation pattern is recognized in the measured values of the second measurement variable.

4. The method of claim 1, wherein redundant measured values from the learning phase are filtered out for determining the correlation pattern.

5. A measurement system for carrying out the method of claim 1, including:
    a first field device designed to measure the first measurement variable at an adjustable measurement rate,
    a second field device designed to measure the second measurement variable that does not correspond to the first measurement variable,
    a control unit designed to
        determine a correlation pattern between the first measurement variable and the second measurement variable on the basis of the measured values measured in the learning phase,
        check at least the measured values of the second field device for the correlation pattern during the measurement operation,
        change at least the measurement rate of the first field device during the measurement operation at least during a time window, in which the correlation pattern is recognized in the measured values of the second measurement variable.

6. The measurement system of claim 5, wherein the first field device and/or the second field device comprise a battery for energy supply.

7. The measurement system of claim 5, wherein the first field device and/or the second field device are/is connected to the control unit using a wireless interface.

* * * * *